(12) United States Patent
Kawabata et al.

(10) Patent No.: US 9,174,198 B2
(45) Date of Patent: Nov. 3, 2015

(54) EXHAUST GAS PURIFICATION CATALYST

(71) Applicant: MAZDA MOTOR CORPORATION, Hiroshima (JP)

(72) Inventors: Hisaya Kawabata, Hiroshima (JP); Masaaki Akamine, Hiroshima (JP); Yasuhiro Matsumura, Hiroshima (JP); Masahiko Shigetsu, Higashi-Hiroshima (JP); Akihide Takami, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 14/395,629

(22) PCT Filed: Mar. 14, 2013

(86) PCT No.: PCT/JP2013/001747
§ 371 (c)(1),
(2) Date: Oct. 20, 2014

(87) PCT Pub. No.: WO2013/161167
PCT Pub. Date: Oct. 31, 2013

(65) Prior Publication Data
US 2015/0087503 A1     Mar. 26, 2015

(30) Foreign Application Priority Data
Apr. 23, 2012   (JP) .................. 2012-097580

(51) Int. Cl.
*B01J 21/04*     (2006.01)
*B01J 23/00*     (2006.01)
(Continued)

(52) U.S. Cl.
CPC .............. *B01J 23/63* (2013.01); *B01D 53/94* (2013.01); *B01D 53/945* (2013.01); *B01J 23/002* (2013.01); *B01J 23/44* (2013.01); *B01J 23/56* (2013.01);
(Continued)

(58) Field of Classification Search
CPC ............ B01J 21/04; B01J 23/10; B01J 23/44; B01J 23/46; B01J 23/56; B01J 23/63
USPC .......... 502/302–304, 327, 332, 333, 339, 349, 502/355, 439
See application file for complete search history.

(56) References Cited

U.S. PATENT DOCUMENTS 8,211,824 B2 *   7/2012   Akamine et al. ............. 502/332
8,551,908 B2 *  10/2013   Satou et al. ................. 502/327
(Continued)

FOREIGN PATENT DOCUMENTS

JP     H09-313938 A    12/1997
JP     2006-036556 A    2/2006
(Continued)

OTHER PUBLICATIONS

International Search Report; PCT/JP2013/001747; Jun. 18, 2013.
(Continued)

*Primary Examiner* — Cam N. Nguyen
(74) *Attorney, Agent, or Firm* — Studebaker & Brackett PC

(57) ABSTRACT

An exhaust gas purification catalytic material for purifying exhaust gas from an engine includes ZrLaY composite oxide containing $ZrO_2$ as a main component, 2% by mass or more and 10% by mass or less of $La_2O_3$, and 2% by mass or more and 20% by mass or less of $Y_2O_3$, and Rh is loaded on the composite oxide.

3 Claims, 5 Drawing Sheets

(51) Int. Cl.
*B01J 23/02* (2006.01)
*B01J 23/08* (2006.01)
*B01J 23/10* (2006.01)
*B01J 23/40* (2006.01)
*B01J 23/42* (2006.01)
*B01J 23/44* (2006.01)
*B01J 23/56* (2006.01)
*B01J 23/63* (2006.01)
*B01D 53/94* (2006.01)
*B01J 37/02* (2006.01)
*F01N 3/10* (2006.01)

(52) U.S. Cl.
CPC .............. *B01J 37/0244* (2013.01); *F01N 3/10* (2013.01); *B01D 2255/1023* (2013.01); *B01D 2255/1025* (2013.01); *B01D 2255/2061* (2013.01); *B01D 2255/2063* (2013.01); *B01D 2255/2065* (2013.01); *B01D 2255/20715* (2013.01); *B01D 2255/40* (2013.01); *B01D 2255/407* (2013.01); *B01D 2255/9022* (2013.01); *B01D 2258/014* (2013.01); *B01J 2523/00* (2013.01); *Y02T 10/22* (2013.01)

(56) References Cited

U.S. PATENT DOCUMENTS

| | | | |
|---|---|---|---|
| 8,568,675 B2 * | 10/2013 | Deeba et al. | 423/213.5 |
| 8,617,496 B2 * | 12/2013 | Wei et al. | 423/213.2 |
| 8,663,588 B2 * | 3/2014 | Lindner et al. | 423/213.5 |
| 8,673,809 B2 * | 3/2014 | Nakatsuji et al. | 502/327 |
| 8,828,343 B2 * | 9/2014 | Liu et al. | 423/213.5 |
| 8,833,064 B2 * | 9/2014 | Galligan et al. | 60/299 |
| 8,912,116 B2 * | 12/2014 | Akamine et al. | 502/304 |
| 8,975,204 B2 * | 3/2015 | Hori et al. | 502/304 |
| 8,999,886 B2 * | 4/2015 | Takeshima et al. | 502/439 |
| 2007/0104950 A1 | 5/2007 | Morikawa et al. | |
| 2008/0187476 A1 | 8/2008 | Larcher et al. | |
| 2009/0324468 A1 * | 12/2009 | Golden et al. | 423/210 |
| 2012/0129690 A1 * | 5/2012 | Larcher et al. | 502/304 |

FOREIGN PATENT DOCUMENTS

| | | |
|---|---|---|
| JP | 2006-297236 A | 11/2006 |
| JP | 2007-532453 A | 11/2007 |
| JP | 2009-034650 A | 2/2009 |
| JP | 2011-161421 A | 8/2011 |
| JP | 2012-040547 A | 3/2012 |
| JP | 2012-096158 A | 5/2012 |

OTHER PUBLICATIONS

Colombo, M.; "Phase relations in $ZrO_2$-$La_2Zr_2O_7$-$Y_2Zr_2O_7$ system"; British Ceramic Transactions; Jun. 1, 1996; vol. 98, No. 6; p. 271-273.

* cited by examiner

FIG.1

|  | OXIDE CONTENT (MASS %) | | | LIGHT-OFF TEMPERATURE | | |
|---|---|---|---|---|---|---|
|  | $ZrO_2$ | $La_2O_3$ | $Y_2O_3$ | HC | CO | NOx |
| EXAMPLE 1 | 91 | 7 | 2 | 274 | 269 | 252 |
| EXAMPLE 2 | 88 | 7 | 5 | 275 | 268 | 252 |
| EXAMPLE 3 | 86 | 6.5 | 7.5 | 274 | 270 | 254 |
| EXAMPLE 4 | 84 | 6 | 10 | 270 | 268 | 252 |
| EXAMPLE 5 | 82 | 6 | 12 | 276 | 271 | 255 |
| EXAMPLE 6 | 79 | 6 | 15 | 281 | 274 | 258 |
| EXAMPLE 7 | 88 | 2 | 10 | 274 | 270 | 253 |
| EXAMPLE 8 | 86 | 4 | 10 | 268 | 262 | 250 |
| EXAMPLE 9 | 82 | 8 | 10 | 280 | 272 | 258 |
| EXAMPLE 10 | 80 | 10 | 10 | 283 | 278 | 261 |
| EXAMPLE 11 | 96 | 2 | 2 | 306 | 303 | 286 |
| EXAMPLE 12 | 88 | 10 | 2 | 302 | 300 | 279 |
| EXAMPLE 13 | 78 | 2 | 20 | 288 | 284 | 272 |
| EXAMPLE 14 | 70 | 10 | 20 | 291 | 286 | 271 |
| COMPARATIVE EXAMPLE 1 | 94 | 6 | 0 | 317 | 312 | 300 |
| COMPARATIVE EXAMPLE 2 | 90 | 0 | 10 | 312 | 308 | 291 |
| COMPARATIVE EXAMPLE 3 | 98 | 2 | 0 | 312 | 310 | 290 |
| COMPARATIVE EXAMPLE 4 | 90 | 10 | 0 | 331 | 326 | 313 |
| COMPARATIVE EXAMPLE 5 | 98 | 0 | 2 | 315 | 311 | 293 |
| COMPARATIVE EXAMPLE 6 | 80 | 0 | 20 | 309 | 306 | 289 |

EXHAUST GAS PURIFICATION CATALYST

TECHNICAL FIELD

The present invention relates to an exhaust gas purification catalytic material for purifying exhaust gas from an engine, and an exhaust gas purification catalyst in which the catalytic material is included in a catalyst layer on a catalyst substrate.

BACKGROUND ART

In vehicles such as automobiles, an exhaust system of an engine employs an exhaust gas purification catalyst in order to purify exhaust gas containing air contaminants such as hydrocarbon (HC), carbon monoxide (CO), and nitrogen oxide (NOx). The exhaust gas purification catalyst is used to oxidize HC and CO for purification and reduce NOx for purification.

Such an exhaust gas purification catalyst is typically an exhaust gas purification catalytic material in which a catalytic metal such as Pd or Rh is loaded on the surface of a catalyst substrate of, for example, alumina with a high specific surface area or a CeZr-based composite oxide (complex oxide) having an oxygen storage/release capacity in a highly dispersed state. This exhaust gas purification catalyst is used for purifying exhaust gas.

Patent Document 1, for example, shows an exhaust gas purification catalyst including an Rh-containing upper catalyst layer and a Pd-containing lower catalyst layer on a catalyst substrate. In this exhaust gas purification catalyst, the upper catalyst layer includes CeZrNdM composite oxide particles containing Ce, Zr, Nd, and an alkali earth metal M and ZrLa-alumina particles in which ZrLa composite oxide containing Zr and La is loaded on the surface of alumina particles, and Rh is dispersed and loaded on the CeZrNdM composite oxide particles and the ZrLa-alumina particles.

CITATION LIST

Patent Document

[Patent Document 1] Japanese Unexamined Patent Publication No. 2011-161421

SUMMARY OF THE INVENTION

Technical Problem

In the exhaust gas purification catalyst described in Patent Document 1, however, when Rh is loaded on alumina loaded with ZrLa composite oxide, Rh is loaded on alumina as well as on ZrLa composite oxide. When the exhaust gas purification catalyst including alumina loaded with Rh is used in an exhaust system of an engine and is exposed to a high-temperature exhaust gas for a long period, some of Rh components are dissolved in alumina so that the dissolved Rh components are deactivated, resulting in the possibility of a decrease in performance of exhaust gas purification.

It is therefore an object of the present invention to provide an exhaust gas purification catalytic material that can reduce deactivation of Rh caused by dissolution of some of Rh components in alumina so as to enhance performance of exhaust gas purification, and an exhaust gas purification catalyst including such a catalytic material.

Solution to the Problem

To achieve the object, the present invention provides the following configurations.

In an aspect of the present invention, an exhaust gas purification catalytic material for purifying exhaust gas from an engine, the catalytic material includes: ZrLaY composite oxide containing $ZrO_2$ as a main component, 2% by mass or more and 10% by mass or less of $La_2O_3$, and 2% by mass or more and 20% by mass or less of $Y_2O_3$, wherein Rh is loaded on the ZrLaY composite oxide.

In another aspect of the present invention, in an exhaust gas purification catalyst, the exhaust gas purification catalytic material described above is included in a catalyst layer on a catalyst substrate.

In a preferred aspect of the exhaust gas purification catalyst, the catalyst layer includes activated alumina loaded with ZrLa composite oxide containing Zr and La, and Rh is loaded on the activated alumina loaded with the ZrLa composite oxide. Here, the ZrLa composite oxide does not contain Y, and is different from the ZrLaY composite oxide.

In another preferred aspect of the exhaust gas purification catalyst, the catalyst layer includes ZrCe-based composite oxide containing Zr and Ce, and Rh is loaded on the ZrCe-based composite oxide.

In still another preferred aspect of the exhaust gas purification catalyst, a catalyst layer containing Pd as well as the catalyst layer containing Rh is formed on the catalyst substrate through which an exhaust gas passage passes, and the catalyst layer containing Rh is located closer to the exhaust gas passage than the catalyst layer containing Pd is (i.e., the catalyst layer containing Rh is located farther from the catalyst substrate than the catalyst layer containing Pd is).

Advantages of the Invention

The foregoing configurations can obtain the following advantages.

First, as an exhaust gas purification catalytic material of the present invention, the exhaust gas purification catalytic material in which Rh is loaded on the ZrLaY composite oxide containing $ZrO_2$ as a main component, 2% by mass or more and 10% by mass or less of $La_2O_3$, and 2% by mass or more and 20% by mass or less of $Y_2O_3$ is employed. Thus, in an exhaust gas purification catalytic material including a catalyst component in which Rh is loaded on alumina loaded with an ZrLa composite oxide, for example, replacement of at least some of the catalyst components by a catalyst component in which Rh is loaded on ZrLaY composite oxide can reduce deactivation of Rh caused by dissolution of some of Rh components in alumina, and ZrLaY composite oxide, which shows a smaller degree of decrease in specific surface area at high temperatures than ZrLa composite oxide, can also reduce deactivation of Rh. As a result, performance of exhaust gas purification can be enhanced. That is, since the ZrLaY composite oxide shows a smaller degree of decrease in specific surface area at high temperatures than ZrLa composite oxide, i.e., the ZrLaY composite oxide does not easily agglomerate, the degree of dispersion of Rh at the surface of the ZrLaY composite oxide can be easily maintained, and purification performance after thermal aging is enhanced as compared to that in the case of using ZrLa composite oxide.

In addition, in an exhaust gas purification catalyst of the present invention, since the exhaust gas purification catalytic material is included in the catalyst layer on the catalyst substrate, advantages similar to those obtained by the exhaust gas purification catalytic material can be obtained.

In a preferred aspect of the exhaust gas purification catalyst, the catalyst layer includes activated alumina loaded with the ZrLa composite oxide containing Zr and La and Rh is loaded on the activated alumina loaded with the ZrLa composite oxide. Thus, in an exhaust gas purification catalytic material including a catalyst component in which Rh is loaded on alumina loaded with ZrLa composite oxide, replacement of at least part of the catalyst component by a catalyst component in which Rh is loaded on ZrLaY composite oxide can reduce deactivation of Rh components dissolved in alumina, and thus, can enhance performance of exhaust gas purification.

In another preferred aspect of the exhaust gas purification catalyst, the catalyst layer includes the ZrCe-based composite oxide containing Zr and Ce, and Rh is loaded on the ZrCe-based composite oxide. Thus, oxygen can be taken in the ZrCe-based composite oxide by means of Rh, and the oxygen that has been taken can be sent to a portion showing a low oxygen concentration. This configuration further ensures the above-described advantages.

In still another preferred aspect of the exhaust gas purification catalyst, the Pd-containing catalyst layer as well as the Rh-containing catalyst layer is formed on the catalyst substrate, and the Rh-containing catalyst layer is located closer to the exhaust gas passage than the Pd-containing catalyst layer is. Thus, the presence of the Rh-containing catalyst layer and the Pd-containing catalyst layer ensures the above-described advantages.

BRIEF DESCRIPTION OF THE DRAWINGS

FIG. 1 shows oxide contents of Rh-loaded ZrLaY composite oxide, Rh-loaded ZrLa composite oxide, and Rh-loaded ZrY composite oxide used in examples and comparative examples.

DESCRIPTION OF EMBODIMENTS

Figure 2:
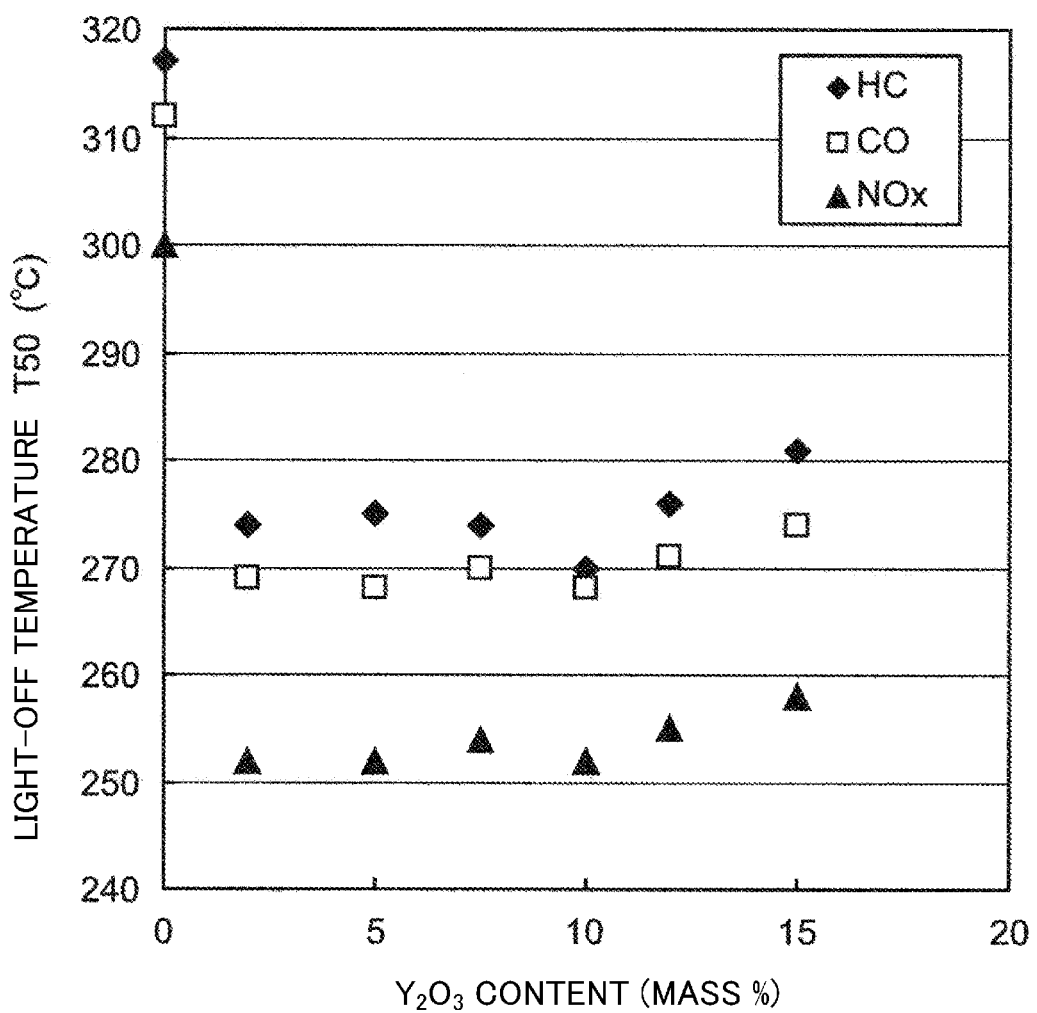
FIG. 2 is a graph showing a relationship between a $Y_2O_3$ content in the Rh-loaded ZrLaY composite oxide and measurement results of the light-off temperature.

An embodiment of the present invention will be described with reference to the attached drawings.

In this embodiment, a catalyst in which an exhaust gas purification catalytic material including Rh loaded on ZrLaY composite oxide containing $ZrO_2$ as a main component, $La_2O_3$, and $Y_2O_3$ is formed on a catalyst substrate is employed as an exhaust gas purification catalyst for purifying exhaust gas.

As exhaust gas purification catalytic materials, catalytic materials with various contents of $La_2O_3$ and $Y_2O_3$ in Rh-loaded ZrLaY composite oxide in which Rh was loaded on ZrLaY composite oxide containing $ZrO_2$ as a main component, $La_2O_3$, and $Y_2O_3$, specifically 14 types of Rh-loaded ZrLaY composite oxides, were used as examples in order to evaluate exhaust gas purification performance.

In addition, catalytic materials with various $La_2O_3$ contents in Rh-loaded ZrLa composite oxide in which Rh was loaded on ZrLa composite oxide containing $ZrO_2$ as a main component and $La_2O_3$, specifically three types of Rh-loaded ZrLa composite oxides, and catalytic materials with various $Y_2O_3$ contents in Rh-loaded ZrY composite oxide in which Rh was loaded on ZrY composite oxide containing $ZrO_2$ as a main component and $Y_2O_3$, specifically three types of Rh-loaded ZrY composite oxides, were used as comparative examples in order to evaluate exhaust gas purification performance.

<Preparation of Catalytic Material>

In examples, to prepare Rh-loaded ZrLaY composite oxide as an exhaust gas purification catalytic material, nitrates of Zr, La, and Y were first mixed, and the mixture was supplemented with water and was stirred at room temperature for about one hour. Then, the nitrate mixture solution and an alkaline solution (preferably 28% ammonia water) were mixed together at a temperature from room temperature to 80° C., and a neutralization process was performed. Thereafter, the solution that had become turbid as a result of the neutralization process was left for a whole day and night, a sediment was obtained with a centrifugal separator, a cake obtained by removing supernatant liquid was sufficiently washed, and the resulting cake was dried at about 150° C. and then held for five hours at 500° C. to be calcined with heat. Then, the resulting product was pulverized. In this manner, powder of ZrLaY composite oxide was obtained.

Subsequently, a nitric acid rhodium solution was added to the powder of ZrLaY composite oxide, and these materials were mixed. The mixture was subjected to evaporation to dryness. After the evaporation to dryness, the resulting dried residue was pulverized, and calcined with heat in the air, thereby obtaining Rh-loaded ZrLaY composite oxide in which Rh was loaded on ZrLaY composite oxide.

In the comparative examples, to prepare Rh-loaded ZrLa composite oxide as an exhaust gas purification catalytic material, instead of mixing nitrates of Zr, La, and Y used in the preparation of Rh-loaded ZrLaY composite oxide of the examples, similar preparation was performed except for mixture of nitrates of Zr and La, and thereby, Rh-loaded ZrLa composite oxide in which Rh was loaded on ZrLa composite oxide was obtained.

To prepare Rh-loaded ZrY composite oxide as an exhaust gas purification catalytic material, instead of mixing of nitrates of Zr, La, and Y used in the preparation of Rh-loaded ZrLaY composite oxide of the examples, similar preparation was performed except for mixture of nitrates of Zr and Y, and thereby, Rh-loaded ZrY composite oxide in which Rh was loaded on ZrY composite oxide was obtained.

<Formation of Catalyst Layer>

To evaluate exhaust gas purification performance, honeycomb substrates serving as catalyst substrates were coated with the Rh-loaded ZrLaY composite oxide of the examples and the Rh-loaded ZrLa composite oxide and the Rh-loaded ZrY composite oxide of the comparative examples, and catalyst layers were formed on the honeycomb substrate.

In the examples, slurry was prepared by mixing Rh-loaded ZrLaY composite oxide, zirconyl nitrate as a binder, and water together, a honeycomb substrate was immersed in the slurry, and then the honeycomb substrate was lifted up so that redundant slurry was blown off with air. The resulting honeycomb substrate was dried so that a catalyst layer including Rh-loaded ZrLaY composite oxide was formed on the honeycomb substrate. The immersion, air blow, and drying of the slurry were repeated until a predetermined amount of the catalyst layer was formed on the honeycomb substrate. Once the predetermined amount of the catalyst layer was formed, the honeycomb substrate was calcined at 500° C., thereby forming a catalyst layer containing Rh-loaded ZrLaY composite oxide on the honeycomb substrate.

In the comparative examples, catalyst layers containing Rh-loaded ZrLaY composite oxide were formed in a manner similar to those of the examples except for using Rh-loaded ZrLa composite oxide or Rh-loaded ZrY composite oxide instead of the Rh-loaded ZrLaY composite oxide. With this process, a catalyst layer containing Rh-loaded ZrLa composite oxide and a catalyst layer containing Rh-loaded ZrY composite oxide were formed on honeycomb substrates. Processes of the examples and the comparative examples were performed under similar conditions except for catalytic materials.

FIG. 1 shows oxide contents of Rh-loaded ZrLaY composite oxide, Rh-loaded ZrLa composite oxide, and Rh-loaded ZrY composite oxide used in the examples and the comparative examples. As shown in FIG. 1, a $Y_2O_3$ content was varied with a substantially constant $La_2O_3$ content (6% by mass to 7% by mass) in ZrLaY composite oxide in Examples 1-6, a $La_2O_3$ content was varied with a constant $Y_2O_3$ content (10% by mass) in ZrLaY composite oxide in Examples 4 and 7-10, a $La_2O_3$ content was varied with a constant $Y_2O_3$ content (2% by mass) in ZrLaY composite oxide in Examples 1, 11, and 12, and a $La_2O_3$ content was varied with a constant $Y_2O_3$ content (20% by mass) in ZrLaY composite oxide in Examples 13 and 14.

As shown in FIG. 1, a $La_2O_3$ content was varied in ZrLa composite oxide in Comparative Examples 1, 3, and 4, and a $Y_2O_3$ content was varied in ZrY composite oxide in Comparative Examples 2, 5, and 6.

<Evaluation of Exhaust Gas Purification Performance>

The honeycomb substrates on which the catalyst layers containing the Rh-loaded ZrLaY composite oxide, the Rh-loaded ZrLa composite oxide, and the Rh-loaded ZrY composite oxide were formed were aged at 1000° C. for 24 hours in an atmospheric environment, and then were each cut into cylindrical shapes each having a diameter of 2.54 cm and a length of 50 mm. Each of the honeycomb substrates had a cell density of 3.5 mil/600 cpsi.

Each of the honeycomb substrates was attached to a fixed-bed flow-type response evaluator so that a model gas was caused to flow, thereby measuring light-off temperatures for purification of HC, CO, and NOx. The light-off temperature is a gas temperature at which purification efficiency of HC, CO, or NOx reaches 50% when the gas temperature of a model gas is gradually increased from room temperature.

The gas composition of the model gas was shown in Table 1 below. As a model gas, while a mainstream gas was allowed to flow constantly at a stoichiometric air-fuel ratio A/F of 14.7, a predetermined amount of gas for changing the A/F ratio was varied in pulses at a rate of 1 Hz, and thereby, the A/F ratio was forced to oscillate in the range of ±0.9. The model gas had a space velocity SV of 60000/hour and a rate of temperature increase of 30° C./min

TABLE 1

| | 14.7 ± 0.9 | | |
|---|---|---|---|
| A/F | 13.8 | 14.7 | 15.6 |
| $C_3H_6$ (ppm) | 541 | 555 | 548 |
| CO (%) | 2.35 | 0.60 | 0.59 |
| NO (ppm) | 975 | 1000 | 980 |
| $CO_2$ (%) | 13.55 | 13.90 | 13.73 |
| $H_2$ (%) | 0.85 | 0.20 | 0.20 |
| $O_2$ (%) | 0.58 | 0.60 | 1.85 |
| $H_2O$ (%) | 10 | 10 | 10 |
| $N_2$ | | Balanced | |

FIG. 1 also shows results of light-off temperature measurement of the Rh-loaded ZrLaY composite oxide, the Rh-loaded ZrLa composite oxide, and the Rh-loaded ZrY composite oxide in the examples and the comparative examples. FIG. 2 is a graph showing a relationship between a $Y_2O_3$ content in the Rh-loaded ZrLaY composite oxide and measurement results of the light-off temperature, and showing measurement results of the light-off temperature for purification of HC, CO, and NOx in Examples 1-6 and Comparative Example 1 shown in Table 1.

As shown in FIGS. 1 and 2, with respect to the light-off temperature for purification of HC, in a case where the $Y_2O_3$ content was varied with a constant $La_2O_3$ content (6% by mass to 7% by mass) in the Rh-loaded ZrLaY composite oxide, the Rh-loaded ZrLaY composite oxides (Examples 1-6) whose $Y_2O_3$ contents were 2-15% by mass, showed light-off temperatures for purification of HC lower than that of the Rh-loaded ZrLa composite oxide (Comparative Example 1) having a $La_2O_3$ content of 6% by mass and a $Y_2O_3$ content of zero.

With respect to the light-off temperatures for purification of CO and NOx, in a case where the $La_2O_3$ content was varied at a substantially constant $Y_2O_3$ content (6% by mass to 7% by mass) in the Rh-loaded ZrLaY composite oxide, the Rh-loaded ZrLaY composite oxides (Examples 1-6) whose $Y_2O_3$ contents were 2-15% by mass, showed light-off temperatures for purification of CO and NOx lower than the Rh-loaded ZrLa composite oxide (Comparative Example 1) having a $La_2O_3$ content of 6% by mass and a $Y_2O_3$ content of zero.

As shown in the measurement results of the light-off temperatures of Examples 11, 7, and 13 and Comparative Example 3 in FIG. 1, even in a case where the $Y_2O_3$ content was varied in the Rh-loaded ZrLaY composite oxide with a $La_2O_3$ content of 2% by mass, the Rh-loaded ZrLaY composite oxides (Examples 11, 7, and 13) whose $Y_2O_3$ contents were 2-20% by mass, showed light-off temperatures for purification of HC, CO, and NOx lower than that of the Rh-loaded ZrLa composite oxide (Comparative Example 3) having a $La_2O_3$ content of 2% by mass and a $Y_2O_3$ content of zero.

As shown in the measurement results of the light-off temperatures of Examples 12, 10, and 14 and Comparative Example 4 in FIG. 1, in a case where the $Y_2O_3$ content was varied with a $La_2O_3$ content of 10% by mass in the Rh-loaded ZrLaY composite oxide, the Rh-loaded ZrLaY composite oxide (Examples 12, 10, and 14) whose $Y_2O_3$ contents were 2-20% by mass, showed light-off temperatures for purification of HC, CO, and NOx lower than that of the Rh-loaded ZrLa composite oxide (Comparative Example 4) having a $La_2O_3$ content of 10% by mass and a $Y_2O_3$ content of zero.

In this manner, the use of the Rh-loaded ZrLaY composite oxides in which Rh is loaded on ZrLaY composite oxides containing $ZrO_2$ as a main component, $La_2O_3$, and $Y_2O_3$ as exhaust gas purification catalytic materials can reduce the light-off temperature for purification HC, CO, and NOx as compared to the case of using Rh-loaded ZrLa composite oxide as an exhaust gas purification catalytic material. Thus, the exhaust gas purification performance can be enhanced.

Figure 3:
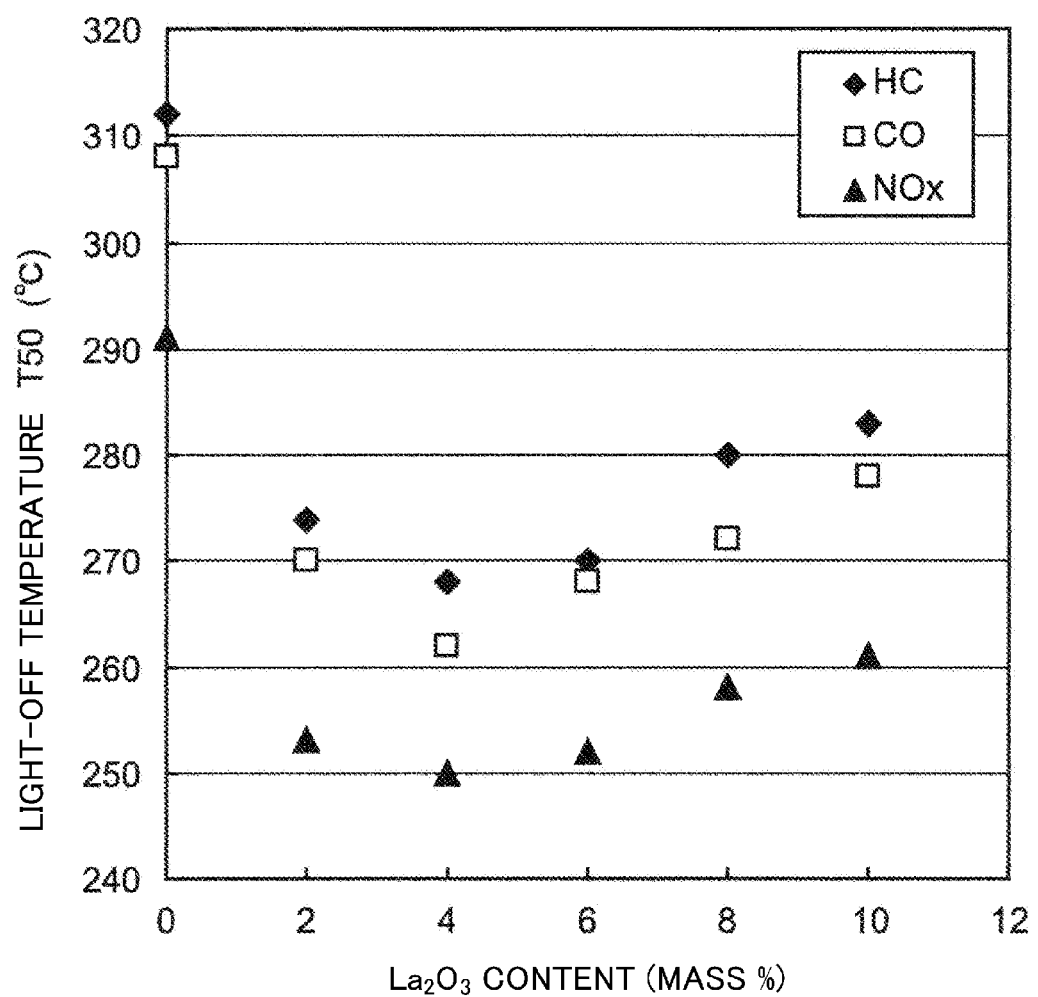
FIG. 3 is a graph showing a relationship between a $La_2O_3$ content in Rh-loaded ZrLaY composite oxide and measurement results of a light-off temperature.

FIG. 3 is a graph showing a relationship between a $La_2O_3$ content in Rh-loaded ZrLaY composite oxide and measurement results of a light-off temperature for purification of HC, CO, and NOx in Examples 4 and 7-10 and Comparative Example 2 in FIG. 1.

As shown in FIGS. 1 and 3, with respect to the light-off temperature for purification of HC, in a case where the $La_2O_3$ content was varied with a constant $Y_2O_3$ content (10% by mass) in the Rh-loaded ZrLaY composite oxide, the Rh-loaded ZrLaY composite oxides (Examples 4 and 7-10) whose $La_2O_3$ contents were 2-10% by mass, showed light-off temperatures for purification of HC lower than that of the Rh-loaded ZrY composite oxide (Comparative Example 2) having a $Y_2O_3$ content of 10% by mass and a $La_2O_3$ content of zero.

With respect to the light-off temperature for purification of CO and NOx, in a case where the $La_2O_3$ content was varied with a constant $Y_2O_3$ content (10% by mass) in the Rh-loaded ZrLaY composite oxide, the Rh-loaded ZrLaY composite oxides (Examples 4 and 7-10) whose $La_2O_3$ contents were 2-10% by mass, showed light-off temperatures for purification of CO and NOx lower than that of the Rh-loaded ZrY composite oxide (Comparative Example 2) having a $Y_2O_3$ content of 10% by mass and a $La_2O_3$ content of zero.

As shown in the measurement results of the light-off temperatures of Examples 11, 1, and 12 and Comparative Example 5 in FIG. 1, in a case where the $La_2O_3$ content was varied with a constant $Y_2O_3$ content of 2% by mass in the Rh-loaded ZrLaY composite oxide, the Rh-loaded ZrLaY composite oxides (Examples 11, 1, and 12) whose $La_2O_3$ contents were 2-10% by mass, showed light-off temperatures for purification of HC, CO, and NOx lower than that of the Rh-loaded ZrY composite oxide (Comparative Example 5) having a $Y_2O_3$ content of 2% by mass and a $La_2O_3$ content of zero.

As shown in the measurement results of the light-off temperatures of Examples 13 and 14 and Comparative Example 6 in FIG. 1, in a case where the $La_2O_3$ content was varied with a $Y_2O_3$ content of 20% by mass in the Rh-loaded ZrLaY composite oxide, the Rh-loaded ZrLaY composite oxides (Examples 13 and 14) whose $La_2O_3$ contents were 2-10% by mass, showed light-off temperature for purification of HC, CO, and NOx lower than that of the Rh-loaded ZrY composite oxide (Comparative Example 6) having a $Y_2O_3$ content of 20% by mass and a $La_2O_3$ content of zero.

In this manner, the use of the Rh-loaded ZrLaY composite oxides in which Rh was loaded on ZrLaY composite oxides containing $ZrO_2$, $La_2O_3$, and $Y_2O_3$ as main components as exhaust gas purification catalytic materials can reduce the light-off temperature for purification HC, CO, and NOx in the case of using Rh-loaded ZrY composite oxide as an exhaust gas purification catalytic material. Thus, the exhaust gas purification performance can be enhanced.

Figure 4:
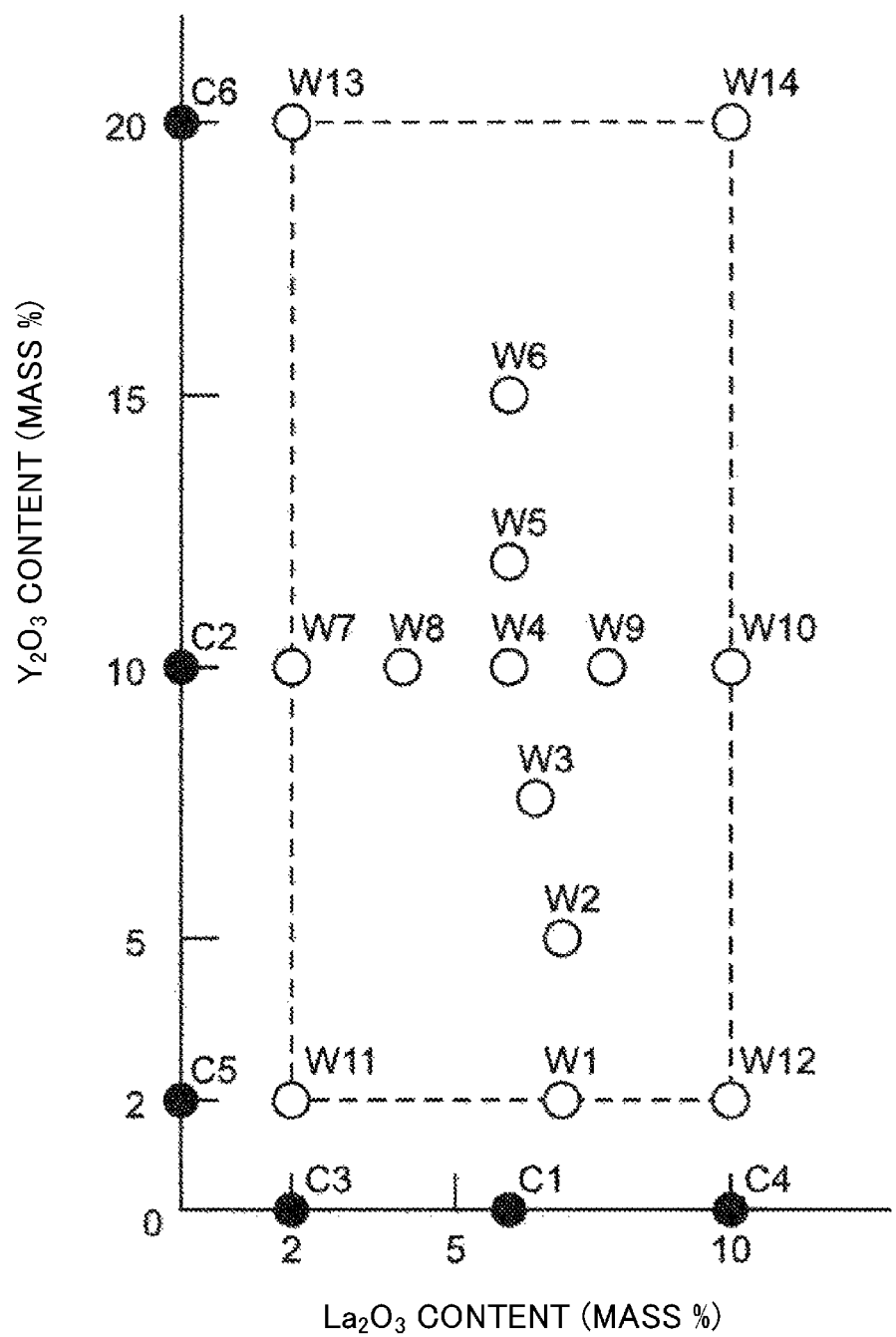
FIG. 4 shows $La_2O_3$ contents and $Y_2O_3$ contents of Rh-loaded ZrLaY composite oxide, Rh-loaded ZrLa composite oxide, and Rh-loaded ZrY composite oxide used in examples and comparative examples.

FIG. 4 shows the $La_2O_3$ contents and the $Y_2O_3$ contents of the Rh-loaded ZrLaY composite oxide, the Rh-loaded ZrLa composite oxide, and the Rh-loaded ZrY composite oxide used in the examples and the comparative examples. In FIG. 4, the Rh-loaded ZrLaY composite oxides of Examples 1-14 are indicated as white circles W1 to W14, respectively, the Rh-loaded ZrLa composite oxides of Comparative Examples 1, 3, and 4 are indicated as black circles C1, C3, and C4, respectively, and the Rh-loaded ZrLa composite oxides of Comparative examples 2, 5, and 6 are indicated as black circles C2, C5, and C6, respectively.

In FIG. 4, in the Rh-loaded ZrLaY oxides of Examples 1-14, the example showing the maximum $La_2O_3$ content and the example showing the minimum $La_2O_3$ content are connected together by broken lines, and the example showing the maximum $Y_2O_3$ content and the example showing the minimum $Y_2O_3$ content are connected together by broken lines. In the Rh-loaded ZrLaY oxides whose $Y_2O_3$ contents and $La_2O_3$ contents are in the region enclosed by the broken lines, the light-off temperature for purification of HC, CO, and NOx can be reduced and the exhaust gas purification performance can be enhanced, as compared to the Rh-loaded ZrLa composite oxide and the Rh-loaded ZrY composite oxide.

In this manner, the use of the Rh-loaded ZrLaY composite oxide in which Rh is loaded on ZrLaY composite oxide containing $ZrO_2$ as a main component, 2% by mass or more and 10% by mass or less of $La_2O_3$, and 2% by mass or more and 20% by mass or less of $Y_2O_3$ as an exhaust gas purification catalytic material can reduce the light-off temperature for purification of HC, CO, and NOx and the exhaust gas purification performance can be enhanced, as compared to the case of using Rh-loaded ZrLa composite oxide.

<Measurement of BET Specific Surface Area>

In this embodiment, in addition to the exhaust gas purification performance evaluation by measuring the light-off temperature, the BET specific surface areas of the ZrLaY composite oxide of Example 4, the ZrLa composite oxide of Comparative Example 1, and the ZrY composite oxide of Comparative Example 2 when being fresh (i.e., before aging) and after aging were measured by an $N_2$ adsorption process. The BET specific surface area of Zr oxide ($ZrO_2$) containing Zr was also measured. The aging was performed at 1000° C. for 24 hours in an atmosphere with 2% of $O_2$, 10% of $H_2O$, and a balance of $N_2$.

Table 2 below shows measurement results of the BET specific surface areas of the ZrLaY composite oxide, the ZrLa composite oxide, the ZrY composite oxide, and the Zr oxide when being fresh (i.e., before aging) and after aging. Table 2 also shows the oxide contents of the ZrLaY composite oxide, the ZrLa composite oxide, the ZrY composite oxide, and the Zr oxide.

TABLE 2

| | | BET specific surface area ($m^2/g$) | |
|---|---|---|---|
| | oxide content (mass %) | fresh | after aging |
| ZrLaY composite oxide | $ZrO_2/La_2O_3/Y_2O_3$ = 84/6/19 | 75.7 | 43.6 |
| ZrLa composite oxide | $ZrO_2/La_2O_3$ = 94/6 | 85.8 | 29.6 |
| ZrY composite oxide | $ZrO_2/Y_2O_3$ = 90/10 | 56.6 | 18.2 |
| Zr composite oxide | $ZrO_2$ = 100 | 52.3 | 16.4 |

As shown in Table 2, when being fresh, the ZrLaY composite oxide has a BET specific surface area smaller than that of the ZrLa composite oxide. On the other hand, after aging, the ZrLaY composite oxide has a BET specific surface area larger than that of the ZrLa composite oxide, and shows a lower degree of decrease in specific surface area at high temperatures than that of the ZrLa composite oxide.

When being fresh or after aging, the ZrLaY composite oxide has a BET specific surface area larger than that of the ZrY composite oxide, and shows a lower degree of decrease in specific surface area at high temperatures than that of the ZrY composite oxide. When being fresh or after aging, the ZrLaY composite oxide has a BET specific surface area larger than that of the Zr oxide, and shows a lower degree of decrease in specific surface area at high temperatures than that of the Zr oxide.

As described above, the ZrLaY composite oxide shows a lower degree of decrease in specific surface area at high temperatures than those of the ZrLa composite oxide, the ZrY composite oxide, and the Zr oxide. When loaded with Rh on the ZrLaY composite oxide, agglomeration of Rh can be reduced and thermal resistance of the catalyst can be enhanced as compared to cases where Rh is loaded on the ZrLa composite oxide, the ZrY composite oxide, and the Zr oxide.

In this embodiment, in the exhaust gas purification catalyst in which the Rh-containing catalyst layer and the Pd-containing catalyst layer are formed on the catalyst substrate and the Rh-containing catalyst layer is located closer to the exhaust gas passage than the Pd-containing catalyst layer is, the Rh-containing catalyst layer containing the Rh-loaded ZrLaY composite oxide, specifically the Rh-loaded ZrLaY composite oxide containing $ZrO_2$ as a main component, 2% by mass or more and 10% by mass or less of $La_2O_3$ and 2% by mass or more and 20% by mass or less of $Y_2O_3$ is used in order to evaluate exhaust gas purification performance.

To evaluate exhaust gas purification performance, an exhaust gas purification catalyst was prepared as Example A in which an upper catalyst layer serving as an Rh-containing catalyst layer included a mixture of Rh-loaded ZrCeNd composite oxide loaded with Rh on ZrCeNd composite oxide containing Zr, Ce, and Nd as ZrCe-based composite oxide, the Rh-loaded ZrLaY composite oxide of Example 5, and La-containing alumina loaded with no catalytic metal and a lower catalyst layer serving as a Pd-containing catalyst layer included a mixture of Pd-loaded ZrCeNd composite oxide loaded with Pd on ZrCeNd composite oxide, Pd-loaded La alumina loaded with Pd on La alumina, and ZrCeNd composite oxide loaded with no catalytic metal.

To evaluate exhaust gas purification performance, a catalyst was prepared as Example B in which a half of the Rh-loaded ZrLaY composite oxide included in the upper catalyst layer of Example A was replaced by a catalyst in which Rh was loaded on alumina loaded with ZrLa composite oxide containing Zr and La.

On the other hand, a catalyst in which all of the Rh-loaded ZrLaY composite oxide included in the upper catalyst layer of Example A was replaced by a catalyst in which Rh was loaded on activated alumina loaded with ZrLa composite oxide containing Zr and La was used as Comparative Example A so as to evaluate exhaust gas purification performance.

Table 3 below shows the catalyst components of the upper catalyst layers and the lower catalyst layers of the exhaust gas purification catalysts used as Example A, Example B, and Comparative Example A. In Table 3, the Rh-loaded ZrCeNd composite oxide is expressed as Rh-loaded ZrCeNdO, the Rh-loaded ZrLaY composite oxide is expressed as Rh-loaded ZrLaYO, the Pd-loaded ZrCeNd composite oxide is expressed as Pd-loaded ZrCeNdO, and activated alumina loaded with Rh and ZrLa composite oxide is expressed as Rh-loaded ZrLa alumina.

TABLE 3

|  | Upper Catalyst Layer | Lower Catalyst Layer |
|---|---|---|
| Example A | Rh-loaded ZrCeNdO, Rh-loaded ZrLaYO, and La alumina | Pd-loaded ZrCeNdO, Pd-loaded La alumina, and ZrCeNdO |
| Example B | ½ of Rh-loaded ZrLaYO of Example A is replaced by Rh-loaded ZrLa alumina | Same as Example A |
| Comparative Example A | Rh-loaded ZrLaYO of Example A is replaced by Rh-loaded ZrLa alumina | Same as Example A |

It will be described how to prepare an exhaust gas purification catalyst of Example A used for evaluation of exhaust gas purification performance.

<Preparation of Catalytic Material of Lower Catalyst Layer>

To prepare ZrCeNd composite oxide, nitrates of Zr, Ce, and Nd were first mixed, and the mixture was supplemented with water and stirred at room temperature for about one hour. The resulting nitrate mixture solution was mixed with ammonia water, thereby performing a neutralization process. Then, the solution that had become turbid as a result of the neutralization process was left for a whole day and night, and a sediment was obtained with a centrifugal separator, a cake obtained by removing supernatant liquid was sufficiently washed, and the resulting cake was dried at about 150° C. and then held for five hours at 500° C. to be calcined with heat. Then, the resulting product was pulverized. In this manner, powder of ZrCeNd composite oxide was obtained. The oxide content (% by mass) of the ZrCeNd composite oxide was set such that $ZrO_2/CeO_2/Nd_2O_3$ was 55/35/10.

To prepare Pd-loaded ZrCeNd composite oxide, powder of ZrCeNd composite oxide was obtained in a manner similar to that of the ZrCeNd composite oxide. The oxide content (% by mass) of the ZrCeNd composite oxide was set such that $ZrO_2/CeO_2/Nd_2O_3$ was 67/23/10. Then, powder of ZrLaY composite oxide was mixed with a nitric acid palladium solution, and then subjected to evaporation to dryness. The resulting dried residue was pulverized, and calcined with heat in the air, thereby obtaining Pd-loaded ZrCeNd composite oxide in which Pd was loaded on the ZrCeNd composite oxide.

To prepare Pd-loaded La alumina, a nitric acid palladium solution was dropped onto powder of activated alumina supplemented with 4% by mass of La, and the resulting powder was calcined at 500° C., thereby obtaining Pd-loaded La alumina.

<Preparation of Catalytic Material of Upper Catalyst Layer>

To prepare Rh-loaded ZrCeNd composite oxide, powder of ZrCeNd composite oxide was obtained in a manner similar to preparation of the ZrCeNd composite oxide of the lower catalyst layer. The oxide content (% by mass) of the ZrCeNd composite oxide was set such that $ZrO_2/CeO_2/Nd_2O_3$ was 80/10/10. Then, the powder of the ZrCeNd composite oxide was mixed with a nitric acid rhodium solution, and the mixture was subjected to evaporation to dryness. The resulting dried residue was pulverized, and calcined with heat in the air, thereby obtaining Rh-loaded ZrCeNd composite oxide in which Rh was loaded on the ZrCeNd composite oxide.

To prepare Rh-loaded ZrLaY composite oxide, powder of ZrLaY composite oxide was prepared in a manner similar to preparation of the ZrCeNd composite oxide of the lower catalyst layer except that mixing of nitrates of Zr, Ce, and Nd was replaced by mixing of nitrates of Zr, La, and Y. The oxide content (% by mass) of the ZrLaY composite oxide was set such that $ZrO_2/La_2O_3/Y_2O_3$ was 84/6/10. Then, the powder of the ZrLaY composite oxide was mixed with a nitric acid rhodium solution, and the mixture was subjected to evaporation to dryness. The resulting dried residue was pulverized, and calcined with heat in the air, thereby obtaining Rh-loaded ZrLaY composite oxide in which Rh was loaded on the ZrLaY composite oxide.

As La alumina, powder of activated alumina supplemented with 4% by mass of La was used.

<Formation of Lower Catalyst Layer>

Slurry was prepared by mixing the ZrCeNd composite oxide, the Pd-loaded ZrCeNd composite oxide, and Pd-loaded La alumina obtained in the preparation of the catalytic material for a lower catalyst layer, zirconyl nitrate as a binder, and water. Then, a honeycomb substrate was immersed in the slurry, and then the honeycomb substrate was lifted up so that redundant slurry was blown off with air. The resulting honeycomb substrate was dried, thereby forming a lower catalyst layer. The immersion, air blow, and drying of the slurry were repeated until a predetermined amount of the lower catalyst layer was formed on the honeycomb substrate. Once the predetermined amount of the lower catalyst layer was formed, the honeycomb substrate was calcined at 500° C., thereby forming a lower catalyst layer on the honeycomb substrate.

<Formation of Upper Catalyst Layer>

Slurry was prepared by mixing the Rh-loaded ZrCeNd composite oxide, the Rh-loaded ZrLaY composite oxide, and La alumina obtained in the preparation of the catalytic material for an upper catalyst layer, zirconyl nitrate as a binder, and water. Then, a honeycomb substrate on which the lower catalyst layer of Example A was formed was immersed in the slurry, and then the honeycomb substrate was lifted up so that redundant slurry was blown off with air. The resulting honeycomb substrate was dried, thereby forming an upper catalyst layer on the lower catalyst layer on the honeycomb substrate. The immersion, air blow, and drying of the slurry were repeated until a predetermined amount of the upper catalyst layer was formed. Once the predetermined amount of the upper catalyst layer was formed, the honeycomb substrate was calcined at 500° C., thereby forming an upper catalyst layer on the lower catalyst layer on the honeycomb substrate.

It will now be described how an exhaust gas purification catalyst of Example B was prepared.

<Preparation of Catalytic Material of Lower Catalyst Layer>

Preparation of a catalytic material of the lower catalyst layer was performed in a manner similar to that of preparation of the catalytic material of the lower catalyst layer of Example A, and ZrCeNd composite oxide, Pd-loaded ZrCeNd composite oxide, and Pd-loaded La alumina were obtained.

<Preparation of Catalytic Material of Upper Catalyst Layer>

Preparation of a catalytic material of the upper catalyst layer was performed in a manner similar to that of preparation of the catalytic material of the lower catalyst layer of Example A, and Rh-loaded ZrCeNd composite oxide, Rh-loaded ZrLaY composite oxide, and La alumina were obtained. Note that the amount of the Rh-loaded ZrLaY composite oxide was reduced to a half (½). In Example B, Rh-loaded ZrLa alumina in an amount equal to the Rh-loaded ZrLaY composite oxide in an amount reduced to ½ was prepared.

In Rh-loaded ZrLa alumina, Rh was loaded on activated alumina loaded with ZrLa composite oxide. To prepare Rh-loaded ZrLa alumina, a mixture solution of nitrates of Zr and La, activated alumina powder, and ammonia water were mixed, and a neutralization process was performed. Thereafter, the solution that had become turbid as a result of the neutralization process was left for a whole day and night, a sediment was obtained with a centrifugal separator, a cake obtained by removing supernatant liquid was sufficiently washed, and the resulting cake was dried at about 150° C. and then held for five hours at 500° C. to be calcined with heat. Then, the resulting product was pulverized. In this manner, powder of ZrLa alumina was obtained.

Subsequently, a nitric acid rhodium solution was added to the obtained ZrLa alumina powder, and these materials were mixed. The mixture was subjected to evaporation to dryness. After the evaporation to dryness, the resulting dried residue was pulverized, and calcined with heat in the air, thereby obtaining Rh-loaded ZrLa alumina. In the Rh-loaded ZrLa alumina, the oxide content (% by mass) of ZrLa alumina was set such that $ZrO_2/La_2O_3/Al_2O_3$ was 38/2/60.

<Formation of Lower Catalyst Layer>

The lower catalyst layer was formed in a manner similar to formation of the lower catalyst layer of Example A, and a lower catalyst layer was formed on a honeycomb substrate.

<Formation of Upper Catalyst Layer>

An upper catalyst layer was formed in a manner similar to formation of the upper catalyst layer of Example A except that ZrCeNd composite oxide, Pd-loaded ZrCeNd composite oxide, Rh-loaded ZrLa alumina, Pd-loaded La alumina, zirconyl nitrate, and water were mixed in order to prepare slurry, and an upper catalyst layer was formed on the lower catalyst layer on the honeycomb substrate.

On the other hand, an exhaust gas purification catalyst of Comparative Example A was prepared in a manner similar to preparation of the exhaust gas purification catalyst of Example A except that the powder of the Rh-loaded ZrLaY composite oxide was replaced by Rh-loaded ZrLa alumina in an amount equal to the powder of the Rh-loaded ZrLaY composite oxide used in preparation of Example A. Rh-loaded ZrLa alumina was prepared in a manner similar to preparation of Rh-loaded ZrLa alumina of Example B.

The thus-obtained honeycomb substrates of Example A, Example B, and Comparative Example A were aged at 1000° C. for 24 hours in an atmospheric environment, and then were each cut into a cylindrical shape with a diameter of 2.54 cm and a length of 50 mm. Each of the honeycomb substrates was attached to a fixed-bed flow-type response evaluator so that a model gas was caused to flow, thereby measuring light-off temperatures for purification of HC, CO, and NOx. The light-off temperature was measured in a manner similar to the measurement of Examples 1-14 and Comparative Examples 1-6.

In this embodiment, in Example A, the amounts of catalyst components of the lower catalyst layers loaded on the honeycomb substrates were such that Pd-loaded ZrCeNd composite oxide was 35 g/L (where the Pd-loaded amount was 0.28 g/L), Pd-loaded La alumina was 45.2 g/L (where the Pd-loaded amount was 4.42 g/L), and ZrCeNd composite oxide was 10 g/L. In addition, the amounts of catalyst components of the upper catalyst layers loaded on the honeycomb substrates were such that Rh-loaded ZrCeNd composite oxide was 90 g/L (where the Rh-loaded amount was 0.2 g/L), Rh-loaded ZrLaY composite oxide as 30 g/L (where the Rh-loaded amount was 0.1 g/L), and La alumina was 12.8 g/L.

As described above, in Example B, a half (½) of the Rh-loaded ZrLaY composite oxide of the upper catalyst layer of Example A was replaced by Rh-loaded ZrLa alumina. In Comparative Example A, all the Rh-loaded ZrLaY composite oxide of the upper catalyst layer of Example A was replaced by the same amount of Rh-loaded ZrLa alumina.

Figure 5:
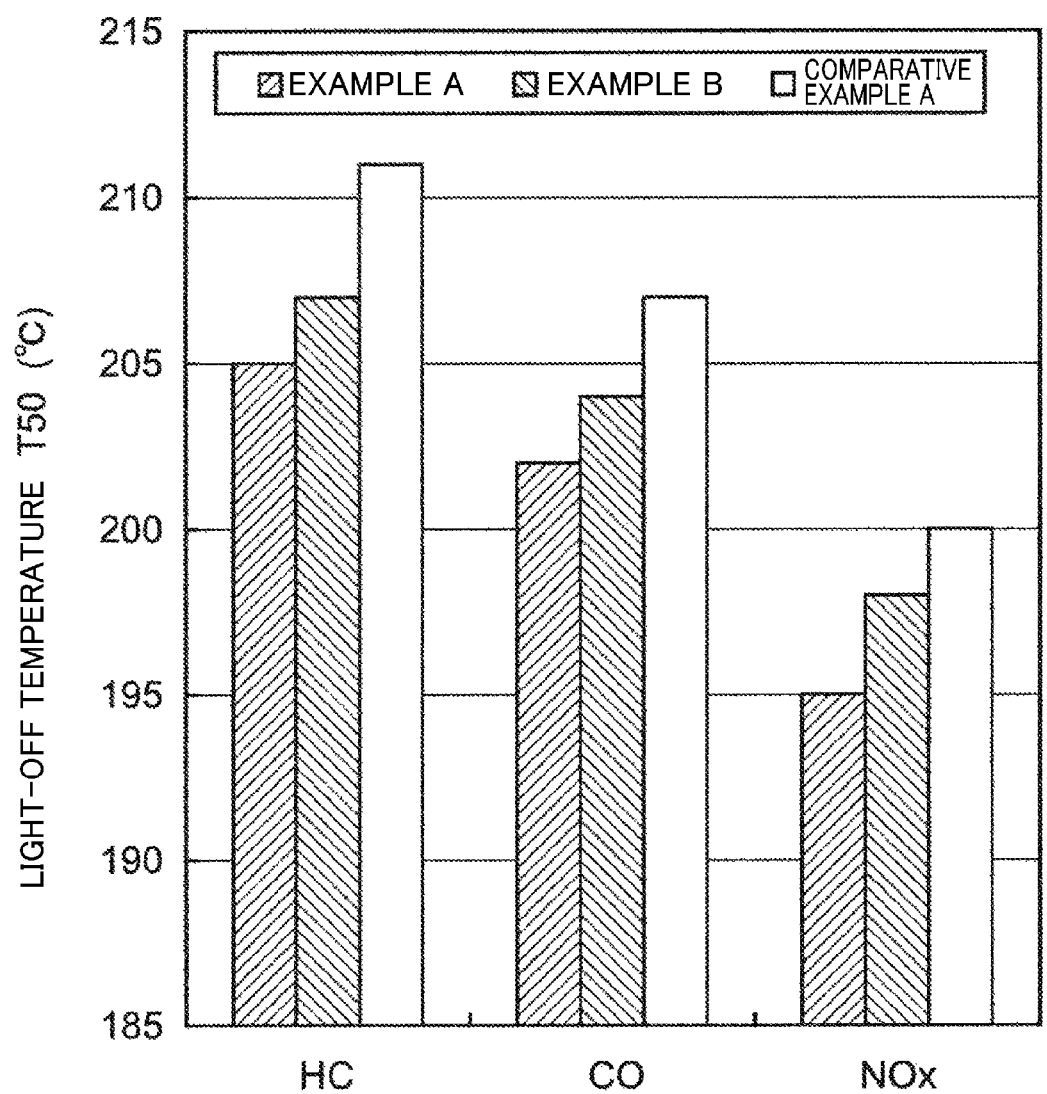
FIG. 5 is a graph showing measurement results of the light-off temperature of an exhaust gas purification catalyst according to an embodiment of the present invention.

Measurement results of the light-off temperature for purification of HC, CO, and NOx of the exhaust gas purification catalysts of Example A, Example B, and Comparative Example A are shown in Table 4 below. FIG. 5 is a graph showing measurement results of light-off temperatures of exhaust gas purification catalysts according to embodiments of the present invention. Specifically, the graph of FIG. 5 shows measurement results of light-off temperatures of Example A, Example B, and Comparative Example A.

TABLE 4

| | Light-off Temperature T50 (° C.) | | |
|---|---|---|---|
| | HC | CO | NOx |
| Example A | 205 | 202 | 195 |
| Example B | 207 | 204 | 198 |
| Comparative Example A | 211 | 207 | 200 |

As shown in Table 4 and FIG. 5, regarding the light-off temperature for purification of HC, as compared to Comparative Example A in which the upper catalyst layer included a predetermined amount of Rh-loaded ZrLa alumina, the light-off temperature for HC purification decreased in Example B in which ½ of Rh-loaded ZrLa alumina of Comparative Example A was replaced by Rh-loaded ZrLaY composite oxide, and the light-off temperature for HC purification further decreased in Example A in which all the Rh-loaded ZrLa alumina of Comparative Example A was replaced by Rh-loaded ZrLaY composite oxide.

Regarding to the light-off temperature for purification of CO, as compared to Comparative Example A in which the upper catalyst layer included a predetermined amount of Rh-loaded ZrLa alumina, the light-off temperature for CO purification decreased in Example B in which ½ of Rh-loaded ZrLa alumina of Comparative Example A was replaced by the Rh-loaded ZrLaY composite oxide, and the light-off temperature for CO purification further decreased in Example A in which all the Rh-loaded ZrLa alumina of Comparative Example A was replaced by the Rh-loaded ZrLaY composite oxide.

Regarding the light-off temperature for purification of NOx, as compared to Comparative Example A in which the upper catalyst layer included a predetermined amount of Rh-loaded ZrLa alumina, the light-off temperature for NOx purification decreased in Example B in which ½ of Rh-loaded ZrLa alumina of Comparative Example A was replaced by the Rh-loaded ZrLaY composite oxide, and the light-off temperature for NOx purification further decreased in Example A in which all the Rh-loaded ZrLa alumina of Comparative Example A was replaced by the Rh-loaded ZrLaY composite oxide.

These results show that in an exhaust gas purification catalytic material including a catalyst component loaded with Rh on alumina in which Rh is loaded on ZrLa composite oxide, replacement of at least part of the catalyst component by a catalyst component in which Rh is loaded on ZrLaY composite oxide can reduce deactivation of Rh caused by dissolution of some of Rh components in alumina, and ZrLaY composite oxide, which shows a smaller degree of decease in specific surface area at high temperatures than ZrLa composite oxide, can also reduce deactivation of Rh. Thus, performance of exhaust gas purification can be enhanced.

In each of the exhaust gas purification catalysts of Example A and Example B, the upper catalyst layer includes Rh-loaded ZrLaY composite oxide of Example 5 described above. Alternatively, the upper catalyst layer may include Rh-loaded ZrLaY composite oxide in which Rh is loaded on ZrLaY composite oxide including $ZrO_2$ as a main component, 2% by mass or more and 10% by mass or less of $La_2O_3$, and 2% by mass or more and 20% by mass or less of $Y_2O_3$, such as the Rh-loaded ZrLaY composite oxides of Examples 1-14.

In such cases, it is possible to reduce deactivation of Rh caused by dissolution of some of Rh components in alumina. It is also possible to reduce deactivation of Rh caused by ZrLaY composite oxide showing a smaller degree of decrease in specific surface area at high temperatures than ZrLa composite oxide. Thus, performance of exhaust gas purification can be enhanced.

As described above, this embodiment employs an exhaust gas purification catalytic material in which Rh is loaded on ZrLaY composite oxide including $ZrO_2$ as a main component, 2% by mass or more and 10% by mass or less of $La_2O_3$, and 2% by mass or more and 20% by mass or less of $Y_2O_3$. Thus, in an exhaust gas purification catalytic material including a catalyst component in which Rh is loaded on alumina loaded with ZrLa composite oxide, replacement of at least part of the catalyst component by a catalyst component in which Rh is loaded on ZrLaY composite oxide can reduce deactivation of Rh caused by dissolution of some of Rh components in alumina and can also reduce deactivation of Rh caused by ZrLaY composite oxide showing a smaller degree of decrease in specific surface area at high temperatures than ZrLa composite oxide. Thus, performance of exhaust gas purification can be enhanced. That is, since the ZrLaY composite oxide shows a smaller degree of decrease in specific surface area at high temperatures than ZrLa composite oxide, i.e., the ZrLaY composite oxide does not easily agglomerate, the degree of dispersion of Rh at the surface of the ZrLaY composite oxide can be easily maintained, and purification performance after thermal aging is enhanced as compared to that in the case of using ZrLa composite oxide.

In addition, since an exhaust gas purification catalytic material in which Rh is loaded on ZrLaY composite oxide including $ZrO_2$ as a main component, 2% by mass or more and 10% by mass or less of $La_2O_3$ and 2% by mass or more and 20% by mass or less of $Y_2O_3$ employs an exhaust gas purification catalyst included in a catalyst layer formed on a catalyst substrate, advantages similar to those described above can be obtained.

Further, as described above, the catalyst layer includes activated alumina loaded with ZrLa composite oxide containing Zr and La, and Rh is loaded on the activated alumina loaded with the ZrLa composite oxide. Thus, in an exhaust gas purification catalytic material including a catalyst component in which Rh is loaded on alumina loaded with ZrLa composite oxide, replacement of at least part of the catalyst component by a catalyst component in which Rh is loaded on ZrLaY composite oxide can reduce deactivation of Rh caused by dissolution of some of Rh components in alumina. Thus, performance of exhaust gas purification can be enhanced.

Furthermore, as described above, the catalyst layer includes ZrCe-based composite oxide containing Zr and Ce, and Rh is loaded on the ZrCe-based composite oxide. Thus, oxygen can be taken in the ZrCe-based composite oxide by means of Rh, and the oxygen that has been taken can be sent to a portion with a low oxygen concentration. As a result, this configuration further ensures the above-described advantages.

Moreover, as described above, the Pd-containing catalyst layer as well as the Rh-containing catalyst layer is formed on the catalyst substrate, and the Rh-containing catalyst layer is located closer to the exhaust gas passage than the Pd-containing catalyst layer is. Thus, the presence of the Rh-containing catalyst layer and the Pd-containing catalyst layer ensures the above-described advantages.

The present invention is not limited to the illustrated embodiment, and various modifications and design changes may be made without departing from the scope of the invention.

Industrial Applicability

As described above, according to the present invention, it is possible to reduce deactivation of Rh caused by dissolution of some of Rh components in alumina, and thus, exhaust gas purification performance can be enhanced. Thus, the present invention is preferably applicable as an exhaust gas purification catalyst for use in vehicles such as automobiles.

The invention claimed is:

1. An exhaust gas purification catalyst for purifying exhaust gas from an engine, the catalyst comprising:
   a catalyst substrate through which an exhaust gas passage passes;
   a catalyst layer containing Rh and located on or above the catalyst substrate; and a catalyst layer containing Pd and located on or above the catalyst substrate, wherein the catalyst layer containing Rh includes ZrLaY composite oxide containing $ZrO_2$ as a main component, 2% by mass or more and 10% by mass or less of $La_2O_3$, and 2% by mass or more and 20% by mass or less of $Y_2O_3$, Rh is loaded on the ZrLaY composite oxide, the catalyst layer containing Rh also includes ZrCeNd composite oxide containing Zr, Ce, and Nd and activated alumina loaded with ZrLa composite oxide containing Zr and La, Rh is loaded on the ZrCeNd composite oxide and the activated alumina loaded with the ZrLa composite oxide, and the catalyst layer containing Rh is located closer to the exhaust gas passage than the catalyst layer containing Pd is.

2. The exhaust gas purification catalyst of claim 1, wherein the catalyst layer containing Rh also includes La-containing alumina loaded with no catalytic metal.

3. The exhaust gas purification catalyst of claim 1, wherein the catalyst layer containing Pd includes ZrCeNd composite oxide loaded with Pd, La-containing alumina loaded with Pd, and ZrCeNd composite oxide loaded with no catalytic metal.

* * * * *